US012702113B2

(12) United States Patent
Gavin et al.

(10) Patent No.: US 12,702,113 B2
(45) Date of Patent: Aug. 11, 2026

(54) MILKING SYSTEM WITH ANALYSIS UNIT

(71) Applicant: LELY PATENT N.V., Maassluis (NL)

(72) Inventors: Peter Michael Gavin, Princeton, NJ (US); Darby Anne McChesney, Lawrenceville, GA (US)

(73) Assignee: LELY PATENT N.V., Maassluis (NL)

( * ) Notice: Subject to any disclaimer, the term of this patent is extended or adjusted under 35 U.S.C. 154(b) by 253 days.

(21) Appl. No.: 18/716,252

(22) PCT Filed: Dec. 8, 2022

(86) PCT No.: PCT/IB2022/061929
§ 371 (c)(1),
(2) Date: Jun. 4, 2024

(87) PCT Pub. No.: WO2023/111785
PCT Pub. Date: Jun. 22, 2023

(65) Prior Publication Data

US 2025/0031658 A1 Jan. 30, 2025

(30) Foreign Application Priority Data

Dec. 16, 2021 (NL) .................................... 2030155

(51) Int. Cl.
*G01N 21/77* (2006.01)
*A01J 5/013* (2006.01)

(52) U.S. Cl.
CPC .................................. *A01J 5/0131* (2013.01)

(58) Field of Classification Search
CPC ......... G01N 21/75–81; G01N 21/8483; G01N 2021/751–786
See application file for complete search history.

(56) References Cited

U.S. PATENT DOCUMENTS 3,261,668 A * 7/1966 Natelson ............. F04B 43/1284 436/95
3,992,158 A * 11/1976 Przybylowicz .......... C12Q 1/54 435/14

(Continued)

FOREIGN PATENT DOCUMENTS

WO WO 2020/067882 A1 4/2020

OTHER PUBLICATIONS

International Search Report mailed on Feb. 15, 2023 in PCT/IB2022/061929 filed on Dec. 8, 2022 (3 pages).

*Primary Examiner* — Alexander A Mercado
(74) *Attorney, Agent, or Firm* — Oblon, McClelland, Maier & Neustadt, L.L.P.

(57) ABSTRACT

A milking system including a milking means, a milk line, and a sampling and analysis device, that includes an analysis tape, with a carrier layer and a reagent tape layer with a reagent that provides a detectable response in the presence of a substance in the sample, a dosing device, an optical radiation source, and an optical sensor device to detect optical response radiation emitted by the reagent tape layer and to analyse the detected optical response radiation to provide an indication of a presence or concentration of the substance in the droplet. The reagent tape layer includes, or is, a material with an asymmetrical porosity, having the largest pore size at a first side where the sample is provided, and the smallest pore size at the opposite side.

7 Claims, 2 Drawing Sheets

(56) References Cited

U.S. PATENT DOCUMENTS

Figure 1:
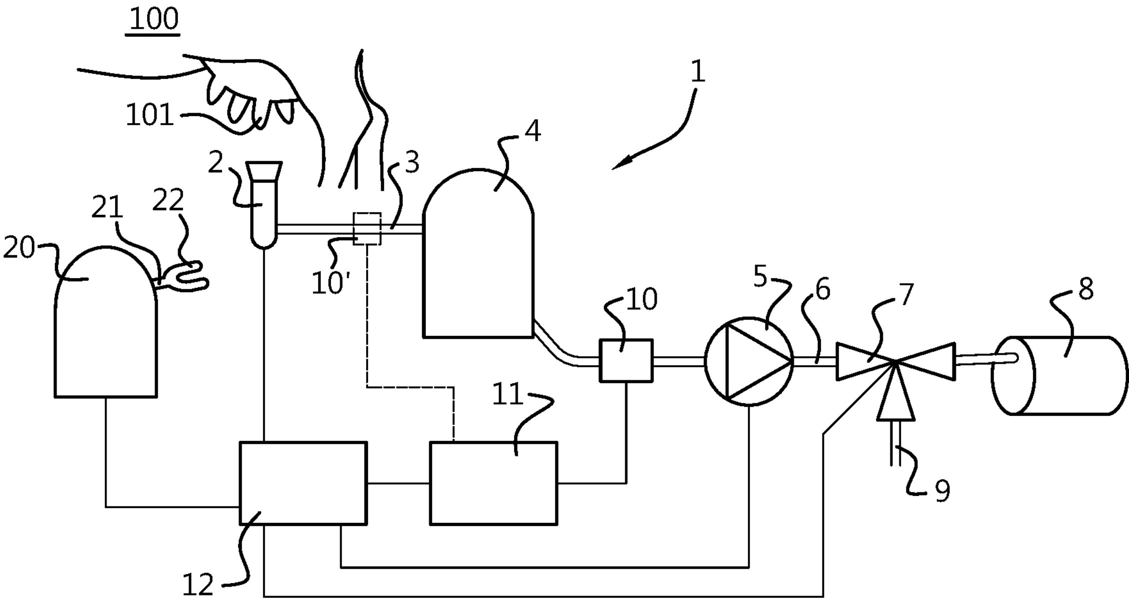

| | | | | |
|---|---|---|---|---|
| 4,264,560 | A * | 4/1981 | Natelson | G01N 35/00009 422/417 |
| 11,925,168 | B2 * | 3/2024 | Gavin | G01N 1/2035 |
| 12,007,400 | B2 * | 6/2024 | De Groot | G01N 21/8483 |
| 2016/0320387 | A1 * | 11/2016 | Maehana | G01N 33/54388 |
| 2018/0264464 | A1 * | 9/2018 | Greef | B01L 3/5023 |
| 2021/0195863 | A1 * | 7/2021 | Gavin | A01J 5/007 |
| 2024/0224926 | A1 * | 7/2024 | Christensen | G01N 21/8483 |
| 2024/0251747 | A1 * | 8/2024 | Christensen | G01N 33/04 |

* cited by examiner

MILKING SYSTEM WITH ANALYSIS UNIT

CROSS REFERENCE TO RELATED APPLICATIONS

This application is a National Stage entry under 35 U.S.C. § 371 of PCT/IB2022/061929, filed on Dec. 8, 2022, and claims priority to NL Patent Application No. 2030155, filed on Dec. 16, 2021, the entire contents of which are incorporated herein by reference.

The present invention relates to a milking system with a sampling and analysis device arranged to take a sample of the milk from the milk line and to analyse milk from the sample.

The milking system comprises milking means with a milking control device and arranged for milking milk from a dairy animal, a milk line in fluid connection with the milking device. The sampling and analysis device comprises a analysis tape, that in turn comprises a carrier layer with a first side and an opposite second side, on which first side there is provided at least one reagent tape layer with a reagent that is arranged to provide a detectable response in the presence of at least one substance in the milk from the sample, and furthermore comprises a dosing device arranged to provide a droplet of said milk from said sample onto the reagent tape layer, an optical radiation source for emitting optical source radiation onto the analysis tape, and an optical sensor device arranged to detect optical response radiation emitted by the reagent tape layer along an optical path to the optical sensor and in response to said emitted source radiation received by said reagent tape layer, and to analyse the detected optical response radiation to provide an indication of a presence or concentration of said at least one substance in said droplet. The carrier layer is transmissive to the optical radiation, and the first side faces away from the optical path to the optical sensor device during analysing by the optical sensor device.

Such a system is known from WO2020067882A1, which discloses a milking system with an analysis device that enables a simple and relatively quick analysis of a milk sample. This in turn allows control of the milking process without the need for a laboratory analysis, and preferably even in-line.

Even though the known system with the analysis device works well in practice, there appeared to be room for improvement as to precision of the measurements. In particular, it turned out that the optical image for detection by the optical sensor device often lacked sufficient definition to come to a reliable analysis of the milk sample.

It is therefore an object of the present invention to improve the known system such that it enables a more reliable analysis of the milk sample, while retaining the advantages of a simple set-up that is applicable to milking systems, and enabling swift results.

The invention achieves this object with the milking system of claim 1.

The inventors have realised that milk is a complex, inhomogeneous fluid. Thus, a number of constituents that are in principle irrelevant for the analysis may interfere with the optical measurements, such as partly blocking the signal of a colour reaction. But these unwanted constituents, such as fat globules, somatic cells, and casein particles, are mostly (if not all) much larger than the desired particles, such as the reagents and the substance to be detected therewith, e.g. LDH, GHB, MUN or hormones such as progesterone. According the present invention, the tape material with the asymmetrical porosity allows to filter away at least part of the unwanted constituents, in a way that allows the part of the milk sample with the desired constituents (reagents and substance(s) to be detected) to penetrate swiftly towards the second side, where the optical measurement takes place, while blocking the undesired constituents along the way in the pores with decreasing dimensions. Near that second side, there will thus be much less interference of unwanted substances, such as fat globules, and the optical signal will be more pronounced and/or have more definition.

Although the cited document WO2020067882A1 also mentions the inhomogeneity of milk, it does not provide a solution above and beyond performing the optical measurement on the side of the transparent base tape layer, i.e. away from the reagent tape layer. In fact, nothing at all is said about the material of the tape.

It is furthermore noted that providing a reagent pad necessarily involves using a porous material. However, it is not sufficient to simply provide a material with a homogeneous pore size that is sufficiently small to block even the smallest undesired constituents to a sufficient (desired) degree. That sufficiently small pore size causes a slow(er) penetration of the milk fluid in at least the part of the base tape layer that faces the provision of the sample droplet, as compared to the base tape layer according to the present invention, that has, or at least can have, a larger pore size than such a material with homogeneous porosity. But the homogeneous and sufficiently small pore size also causes the undesired constituents to be filtered in a very thin layer of the tape material. After all, they are filtered out in the topmost layer of the base tape layer. This causes additional blocking of the flow of the milk fluid.

All of the above is prevented by providing the asymmetrical porosity. The latter ensures a sufficiently rapid flow of the sample through at least the uppermost part of the reagent tape layer towards the second side, while gradually filtering out the undesired constituents. These constituent, such as fat globules, are of different size, and will therefore spread, i.e. be filtered out, over a larger thickness of the reagent tape layer. And because these particles are not stopped in one thin layer, but more spread out, this hinders the milk sample flow less, while still ensuring that the undesired constituents do not reach the second side of the base tape layer, where the optical measurements take place. Thus, as a result, the measurements can still be swift, allowing useful management of the milking process based on the analysis result. Furthermore, the detection and analysis will be more reliable, because the small pore size at the second side of the base tape layer provides a more pronounced and vivid colouring of the base tape layer. Without wishing to be tied to an explanation, it is believed that the reagent, that provides the colour reaction, has efficiently reached the second side, but more importantly is present in a high number of pores with small dimensions, which gives a more prominent and uniform colour, which can more reliably be detected.

In the present invention, the pores may serve to allow the milk to penetrate towards the second side, but also to filter out unwanted particles. These unwanted particles may be of many kinds, as mentioned above. For convenience, the rest of the text will only speak of fat globules, because these are present up to 5% or more. Nevertheless, any other solid particle of comparable size will of course also be filtered out.

In the present invention, the milking means may basically be, or at least comprise, milking cups. In this case, a milk line will run from the milking cup to a milk jar (in particular in case of a milking robot), to a milk claw, or even directly to a milk tank. However, it is also possible to consider a complete milking device as the "milking means", such as an automatic milking machine e.g. a milking robot, or a conventional milking machine. As mentioned above, a milking robot will have a milk jar, while a conventional milking machine may have a milk jar, or may lead the milk directly from its milk claw to a milk tank. Both the milking robot and the conventional milking machine will have a milk line that runs to a bulk milk tank. In all of the above cases, the sampling and analysis device may sample milk from any milk line, thus either from an individual teat, or from mixed milk, either from the claw, or from a milk line that runs after the point-of-confluence of the individual milk lines from corresponding milking cups. In the case of sampling of milk from individual teats, it is possible to use only one sampling point on one milk line from one milking cup, or have two or more sampling points on a corresponding number of milk lines from individual milking cups. In the case of mixed milk, the sampling point may be provided at any point after a point-of-confluence of the individual milk lines of the milking cups. This point-of-confluence may be the milk claw or the milk jar.

It is noted that throughout this application, the "reagent tape layer" will be a layer of a basic material, to which one or more substances may have been added, such as in particular the reagent, and possibly a preservative, stabiliser, and so on. The basic material is a material with physical properties that allow it to be treated as a separable layer. It is also possible for the reagent tape layer to comprise a plurality of such materials, at least one of which has such physical properties, so that as a whole it could be treated as a layer, e.g. wound on a bobbin or the like. It is also noted that the reagent tape layer need not cover all of the second side of the carrier tape, but may be divided into a number of separate parts, or "pads".

The present invention allows to obtain a better optical image of a reaction of sample milk with the analysis tape. This means that the reliability of a measurement, and thus of any subsequent action taken on the basis thereof, may be improved. Examples are the separation of milk that is unsuitable for a certain use, such as human consumption or the making of cheese. It is likewise possible to obtain measurement results with a similar reliability, but then sooner than in the prior art systems. This in turn allows to process the milked milk sooner. It may then e.g. be possible to sample and analyse milk while it is being milked, and obtain the measurement result so much sooner that the destination for the milk may be determined before the milking has actually finished, or at least with a much shorter waiting time. This could lead to milking systems with an increased productivity.

Attractive or otherwise special embodiments of the invention are described in the dependent claims, as well as in the following.

It may suffice for the milking system to obtain said indication of the presence or concentration of the particular substance in the milk. For example, if a mastitis-indicating substance, or increase in concentration thereof, such as lactate dehydrogenase (LDH), or amyloid A, is detected, the dairy animal should be tested for mastitis. If such is the case, the animal should be treated, e.g. with antibiotics, and then the milk must be discarded. Or the concentration of progesterone is determined, a minimum concentration indicating readiness for insemination. It will be clear that a more reliable determination by the milking system will lead to better management of the dairy animals, less milk loss and better animal health comfort.

Herein, it is furthermore noted that, in most cases, milk is sampled only when the milking has ended, because then a representative sample may be taken, as the composition of milk changes during milking, in particular the amount of fat. But since postponing the pumping of milk from a milk jar to the bulk milk tank while awaiting the test result would lead to a lower occupation of the milking system, this is rarely done. Thus, in case of doubt, milk is to be separated and not sent to the bulk milk tank. Thus, being able to obtain the test results quicker offers advantages, in that the available waiting time, and thus the drop in effective occupation of the milking system, is reduced. The present invention offers this possibility, in that the increased signal strength allows an earlier determination of the presence or concentration of the substance without a concurrent loss of reliability. Thus, in particular, the milking control device is arranged to control at least part of the milking on the basis of said indication, in particular to guide the milked milk to an indication-dependent destination.

In embodiments, the largest pore size is larger than an average fat globule diameter of milk of said dairy animal, and the smallest pore size is smaller than said average fat globule diameter. In this way, a large part of the possibly interfering particles can penetrate at least to a certain depth into the reagent tape layer, and only the very largest ones will already be filtered out near the outer surface of the reagent tape layer. But because the number of the latter will be small, that will not hinder the penetration of the milk sample into the reagent tape layer. Furthermore, because the pore size drops to a value below the average fat globule diameter, when going towards the second side, most of the fat globules will (gradually) be filtered out of the milk sample. Even when not all fat globules, and other particles, are filtered out, their number and their impact will have diminished greatly.

It is remarked here that the average fat globule diameter, and in fact the size distribution of the fat globules, varies between animals, between animal races, and even more so between animal species. For example, a rule-of-thumb value for the average fat globule diameter for dairy cows is 3.5 μm. For buffaloes, for example, the average diameter is around 5 μm. Furthermore, buffalo milk also contains much more fat than cow's milk. Thus, it may be advisable to select a suitable largest and smallest pore size in order to effectively filter out the fat globules present in the milk.

In embodiments, the largest pore size is between 5 and 20 μm, and the smallest pore size is between 0.05 and 2 μm. With these values, useful properties may be obtained for the reagent tape for many types of dairy animals, such as cows, buffaloes and so on.

In attractive embodiments, the reagent tape layer comprises polysulfone or polyethersulfone. As mentioned above, this means that the basic material for the reagent tape layer may be polysulfone or polyethersulfone, while substances may have been added, in particular of course a reagent. Polysulfone and polyethersulfone are materials that may be given the required porosity, are compatible with milk, and show sufficient strength and processability. Nevertheless, other materials are not excluded.

The above described set-up of the analysis tape is relatively simple, with basically just one layer in which the reaction takes place. However, sometimes, it may be necessary to provide an additional substance in order for the reaction to take place, e.g. to prime the milk or the reagent, such as by changing the pH of the milk. Sometimes the additional substance may be a part of a homogeneous reagent tape layer, but sometimes it should be kept separate, such as for stability reasons or not reacting with the reagent before addition of the milk. In suitable embodiments, therefore, the reagent tape layer comprises, as separate layers an indicator layer, an adhesive layer, and a reactor layer, wherein said indicator layer comprises said reagent, the reagent being transportable by the sample of milk through the adhesive layer to the reactor layer, wherein said reactor layer comprises a substance for enhancing or inducing said response from said reagent in the presence of said at least one substance in the sample, and wherein at least one of the reactor layer and the indicator layer comprises said material with asymmetrical porosity. Herein, the indicator layer will be the outermost layer, and thus the first layer to be contacted by the milk sample, so that the mixing with the indicator, and thus the reaction, can start as soon as possible, while the combination of milk and indicator flow towards the reactor layer and finally the second side. It suffices when one of the layers in the reagent tape layer has the porosity as per the present invention. The possibly interfering particles will then have been filtered out to a large part. Note herein that the adhesive layer needs to have a liquid-pass property. Thereto, the adhesive layer may have such property inherently, or, if these are not present inherently, the adhesive layer has been provided with through holes.

It may be advantageous to provide only the reactor layer with the porosity according to the present invention, while providing the indicator layer with different properties, in particular to hold as much fluid as possible, and/or with optimised flow-through properties. Both kinds of properties may help to increase the flow of the milk sample towards the reactor layer.

The indicator layer may be provided in a number of forms such as an irregular mat of fibers or the like. In embodiments, the indicator layer comprises a woven fabric, preferably of a multifilament yarn. The inventors found that such a structure for the material led to the ability to hold more fluid. Thereby, it was also possible to add more indicator to the material, i.e. to the indicator layer, which in turn means that the obtainable signal can be stronger. Suitable materials for the filaments are polyesters and nylons, although other materials are not excluded.

In another aspect, the invention relates to a method of analysing a milk sample, comprising

- providing an analysis tape, that comprises a carrier layer that is transmissive to optical radiation and has a first side and an opposite second side, on which first side there is provided at least one reagent tape layer with a reagent that is arranged to provide a detectable response in the presence of at least one substance in the sample,
- providing a droplet of said milk sample onto the reagent tape layer, and having the droplet react with the reagent to generate said response,
- obtaining an image of the reagent layer through the carrier layer by means of an optical sensor device, and
- assessing the obtained image with respect to said response, wherein the reagent tape layer comprises, or is, a material with an asymmetrical porosity, having the largest pore size at the first side, and the smallest pore size at the second side.

It will be clear that this method provides the same advantages as mentioned for the milking system. Briefly, the filtering out of possibly interfering particles, in particular fat globules in the milk, makes it possible to obtain a clearer, more intense and/or higher-definition image of the response. In turn, this enables a more reliable determination of a presence or even concentration of an ingredient in the milk sample and/or to determine said presence or concentration more speedily. Likewise, all special features relating to the analysis tape as mentioned for the first aspect of the invention hold for the method according to this aspect as well.

In yet another aspect, the invention relates to an analysis tape for use in the milking system and/or in the method according to the present invention, the analysis tape comprising a carrier layer that is transmissive to optical radiation and has a first side and an opposite second side, on which first side there is provided at least one reagent tape layer with a reagent that is arranged to provide a detectable response in the presence of at least one substance in a milk sample, wherein the reagent tape layer comprises, or is, a material with an asymmetrical porosity, having the largest pore size at the first side, and the smallest pore size at the second side. Again, the advantages and effects of this analysis tape will have become clear from the foregoing, and need not be repeated here. Likewise, all special features as mentioned for the above other aspects, that relate to the analysis tape, likewise hold for the special embodiments of the analysis tape according to this aspect.

Figure 2:
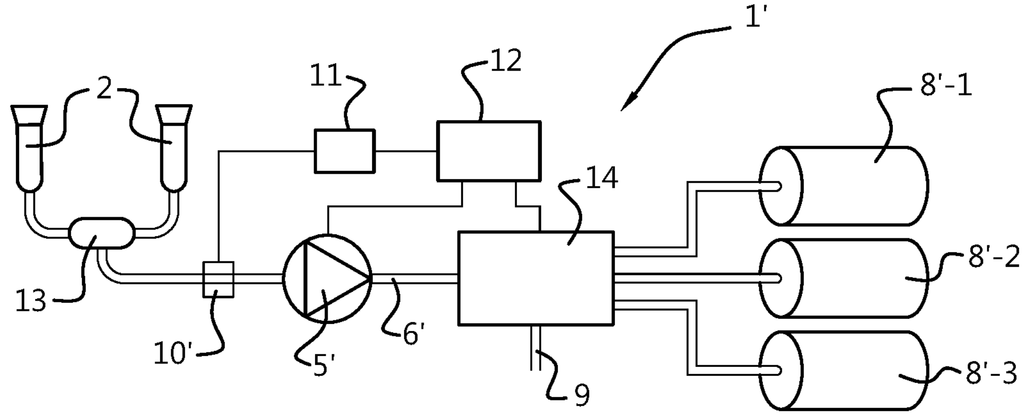
Figure 3:
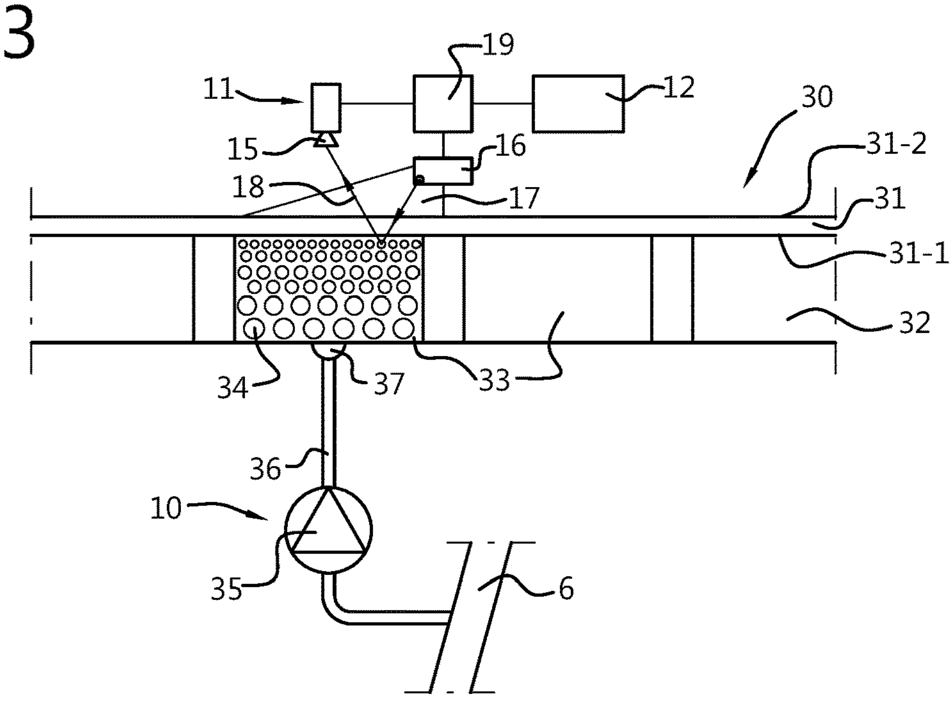
Figure 4:
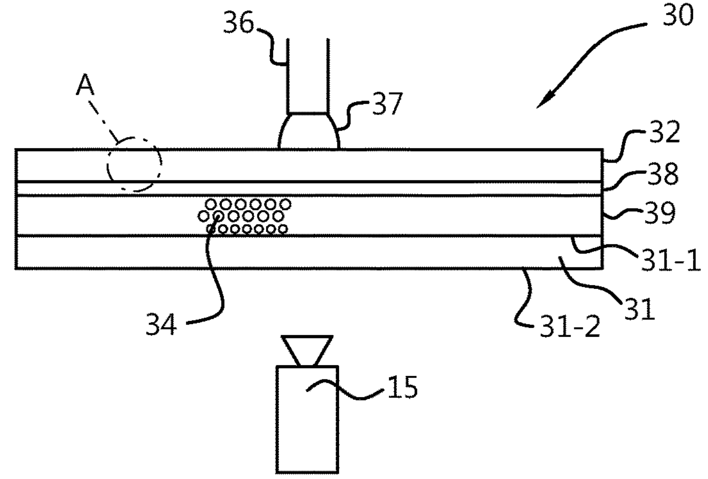
Figure 5:
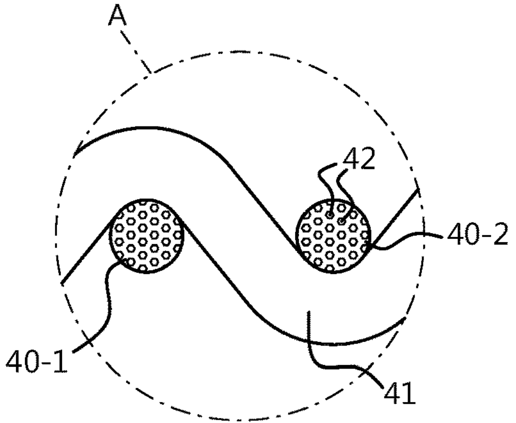

The invention will now be explained further with reference to a number of embodiments, and to the drawings and the description thereof, in which is shown in:

FIG. 1 a diagrammatic view of a first embodiment of a milking system according to the invention FIG. 2 a diagrammatic view of a second embodiment of a milking system according to the invention, FIG. 3 a diagrammatic cross-sectional view of a first embodiment of an analysis tape for use in the milking system according to the invention, FIG. 4 a diagrammatic cross-sectional view of a second embodiment of an analysis tape for use in the milking system according to the invention, and FIG. 5 detail "A" of FIG. 4 in diagrammatic close-up.

FIG. 1 shows a diagrammatic view of a first embodiment of a milking system 1 according to the invention. The milking system 1 comprises a teat cup 2 for milking a teat 101 of a dairy animal 100. The milk flows via short milk tube 3 to a milk jar 4, from which a milk pump 5 pumps the milk via the long milk line 6 and a three-way valve 7 to a bulk milk tank 8 or a sewer 9. A sampling device 10 sends a milk sample to an analysing device 11. A milking control device is indicated by reference numeral 12. The milking system 1 may optionally comprise a milking robot 20, with a robot arm 21 and for example a gripper 22. An alternative or additional sampling device is denoted by reference numeral 10'.

The milking system 1 shown has a milking robot 20 for automatically connecting the teat cup, or milking cup, 2 to a teat 101 of a dairy animal 100, such as a cow. Alternative systems, such as with a plateau on which all teat cups 2 rest in a resting position, also exist. Furthermore, it is possible to connect the teat cup 2 manually, that is without a milking robot 20.

Most milking systems will have more than one cup 2, such as two for goats, or 4 for cows. Yet, only one has been shown for clarity. The milk is sucked from the teats 101 by means of a vacuum system (not shown), and is led via a short milk tube 3 to a milk jar 4. In this milk jar 4, the milk of a milking is collected before it is sent further. Thereto, the milk pump 5 can pump all of the milk through the long milk line 6 to a bulk milk tank 8, if it is milk that is fit for human consumption, or to a sewer 9 or the like if it is not. For example depending on the health or the like of the dairy animal 100, the milk is to be separated from the milk for human consumption. Examples are the situation that the animal 100 has mastitis or some other disease that has negative influence on milk quality, or that the animal 100 is being treated with antibiotics, that are not allowed to be present in consumption milk. The animal may be identified by a dairy man, and its ID my be keyed in, so that the milking control device 12 can set the milking system 1, in particular the three-way valve 7, accordingly. Alternatively, the milking system comprises an animal ID device (not shown here, but well-known in the art) that automatically determines the animal ID, and sends this to the milking control device 12.

In the above described situations, the quality of the presently milked milk is not relevant for the decision where to send the milk. Obviously, that quality can change between subsequent milkings, and it is therefore useful if the quality of the presently milked milk may be determined, before a decision is taken where to send that milk. Thereto, the milking system 1 comprises an analysis device 11 for analysing a sample of the milk. Such a sample may be obtained by means of a sampler 10, that is shown only generally in the drawings, as many details about such a device are well-known in the field. Here, the sampling device 10 takes a sample from the mixed milk, i.e. milk that has been collected in the milk jar 4, coming from all teat cups 2. It is then possible to determine the presence and/or concentration of one or more substances in the milk. Important examples are somatic cell count (SCC), fat concentration, and mastitis indicators such as LDH or amyloid A. Mastitis is an important dairy animals' disease, but may be confined to one or a few teats. In order to be able to determine what teat is diseased, it is possible to position a sampling device 10' in the short milk tube 3. It will be clear that, in that case, four sampling devices 10' will be required for a cow, and a corresponding number for other dairy animals. However, the analysis is now possible well before the milk is pumped from the milk jar 4. It is possible that the teat cup 2 comprises means for collecting the first gushes of milk (the foremilk) of the teat 101, and sending it to a separate destination. It is then possible that that foremilk is sampled and analysed by the devices 10 and 11, respectively, so that there is more time for determining the milk quality. Details of such foremilk collecting means are not shown, but known in the art.

Based on the outcome of the determination of the presence and/or concentration of a substance in the milk sample, by means of the analysis device 11, the milking control device 12 decides where to send the milk of the milk jar. More details about these aspects will become clearer with reference to the following Figures.

FIG. 2 shows a diagrammatic view of a second embodiment of a milking system 1' according to the invention. Herein, similar parts have been denoted with like reference numerals, if need be with a prime ('). The embodiment shown has two teat cups 2 that are connected to a milk claw 13, from which the combined milk flows via a long milk line 6' under the influence of a pump 5'. a sampling device 10' sends a milk sample to the analysis device 11. Based on the analysis result, the milking control device 12 sets a multi-way valve 14 such as to send the milk to one of the bulk tanks 8'-1, 8'-2 or 8'-3, or to the sewer 9.

Such embodiment, with a milking claw 13, is often present in conventional milking systems 1'. Sometimes these milking systems do not have a milk jar, as do milking robot systems, but they send the milk directly into a long milk line 6'. This is for example because in conventional milking systems, humans check the foremilk quality. Yet, it may be relevant to be able to send the milk to a desired destination. Thereto, the sampling device 10' may sample milk, and have it assessed by the analysis device 11, during milking. The analysis result is then used by the milking control device 12 to send the milk to any of a plurality of destinations. In the Figure, these are the sewer 9 as before, but also three bulk milk tanks 8'-1 to 8'-3, that e.g. hold milk of different fat contents. In such case, milk of a single milking could even be divided into two or more sub-batches if the analysis is sufficiently quick.

FIG. 3 shows a diagrammatic cross-sectional view of a first embodiment of an analysis device and analysis tape for use in the milking system according to the invention. The sampling device 10 is shown diagrammatically as a branch of the long milk line 6, through which a sample pump pumps a milk sample through a dosing tube 36 in order to deliver a droplet 37 to an analysis tape 30. This tape has a carrier layer 31 and a reagent tape layer 32. The carrier layer 31 has a first side 31-1 and a second side 31-2. The reagent tape layer 32 consists of a number of pads 33 with pores indicated with reference numerals 34.

An analysis device 11 comprises a camera 15 and a light source 16 that emits optical radiation 18, such as beam 19 that is reflected to the camera 15. Reference numeral 19 indicates an optical analyser.

It is noted that some parts, like an optional flow divider, cleaning devices and the like, are not shown, since they are not relevant to the invention, but are well-known in the field.

When the sampling device 10 provides a droplet 37 of sampled milk to the analysis tape 30, by means of the sample pump 35, the milk is quickly absorbed by the reagent tape layer 32. This layer 32 comprises a reagent that will react with a milk component that is to be determined, such as LDH or amyloid A, to indicate mastitis, or pH, or some other substance. the reagent is of course selected accordingly, in order to provide a detectable response, such as in particular a colour change.

To prevent the milk from flowing unchecked, the reagent tape layer 32 is subdivided into a number of pads 33 by any known method such as laser cutting. The details of the sampling device 10 may be taken e.g. from the document NL-2021685A1, that delivers a sample droplet from below, as suggested by the present FIG. 3. Nevertheless, the sample droplet may also be provided in any other way, such as from above, the camera 15 then looking from below.

The milk droplet is absorbed by the reagent tape layer 32 by means of capillary action of the channels or "pores" in that layer. The relative sizes of these pores have been indicated in the FIG. 3 by means of circles of varying diameter. It can be seen that, in accordance with the invention, the diameter of the pores 34 changes from the largest at the surface where the droplet 37 is delivered, to the smallest at the first side 31-1 of the carrier layer. this leads to the following effect. The large pores at the surface of the pad 33 have a diameter of e.g. between 5 and 20 μm. This allows the milk to be absorbed quickly, which is useful to spread the milk in the pad 33 and to start the reaction as quickly as possible. However, when the milk enters deeper layers (i.e. "higher up" in the drawing) of the reagent tape layer 32, the pore size becomes smaller. This leads to particles like fat globules, that are invariably present in whole milk, to become stuck and thus be filtered out. The pore size towards the first side 31-1 is preferably selected such that substantially only liquid without such (larger) particles will be present near the first side 31-1. For cow's milk, a smallest pore size of between 0.1 and 2 μm ensures that most such particles have been filtered out, although other numbers are certainly not excluded, based on the particular properties of the milk to be milked.

The milk liquid that effectively remains near the first side is thus, to a smaller or larger part, devoid of fat globules and other particles that might interfere with the detection of the colour reaction or other reaction of the reagent in the reagent tape layer 32 with the relevant milk component. The relative concentration of the reagent may even become higher, and the definition of the reaction may be higher, also because there will be a higher number of smaller pores.

With the reaction thus developing, the analysis system 11 will ac in the way that is known per se. The light source 16 (that may in fact be ambient light, although a controllable light source will provide more reliable results) emits optical radiation 17, such as visual or infrared radiation. This radiation will interact with the reagent in the reagent tape layer 32 that undergoes a colour change or the like as a result of the reaction with the milk component to be detected. An example of radiation that interacts and is emitted by the reagent tape layer 32 is beam 18. All of such beams 18 (that may in fact be reflected radiation, or even emitted radiation such as fluorescent radiation) that are caught by the camera 15 will provide an image, that is analysed by the optical analyser 19. For example, this analyser 19 comprises an image processor that measures the intensity of a colour or colour change, as is known per se. The result of the optical analyser 19 is then sent to the milking control device 12.

Obviously, the carrier layer 31 will be of a material that transmits the radiation. Examples are polyesters or polypropylene, in a thickness of for example 0.1 to 0.2 mm. The reagent tape layer can for example be made of polysulfone or polyether sulfone. Such layers, with a number of desired pore diameter gradients, may be obtained from Pall Corporation.

By means of the present invention, the camera 15 will be able to obtain a "cleaner", crisper image, with a higher intensity and a better definition. The image will also develop quicker than if the reagent tape layer would have had the larger pore size throughout, thus without the filtering out of interfering particles. Thus, it would also be possible with the present invention to obtain an image of similar intensity and definition as with the prior art systems, but then quicker.

FIG. 4 shows a diagrammatic cross-sectional view of a second embodiment of an analysis tape 30 for use in the milking system according to the invention. Now, the "tape" 30 may be a separate element, i.e. not an elongate part with separate pads 33, but a single-use element or strip. The tape 30 comprises a carrier tape 31 with a first side 31-1 and a second side 31-2, as well as an indicator layer 32, an adhesive layer 38 and a reactor layer 39. Other parts shown with the same reference numerals are similar to parts shown the other Figures.

The milk droplet 37 is again delivered by the dosing tube 36, onto the indicator layer 32. The layer 32 contains a reagent, that provides a colouring when combining with the desired milk component, but only under special circumstances, such as a different pH-value. For that reason, there is provided the reactor layer 39, that contains a priming substance, such as an acid or base for changing the pH of the milk from the droplet. When the milk from the droplet 37 is supplied to the outermost reagent layer, it mixes with the reagent, and the mixed fluid travels further, into the reactor layer 39. There it encounters the priming substance, and the colouring (or other) reaction will begin. Then, as before, the milk cum reagent will reach the first side 31-1 of the carrier tape, and there the reaction (colouring, . . . ) is observable by the camera 15.

In this embodiment, the reactor layer 39 has the asymmetrical porosity as described for the reagent layer 32 in FIG. 3. The pores 34, again indicated diagrammatically, have a diameter that gradually decreases towards the first side 31-1, so that possibly interfering particles such as fat globules or the like will be filtered out, and the reaction will be more clearly visible for the camera 15. It is possible to provide the topmost layer, i.e. the reagent layer 32, also with similar asymmetric porosity properties, but in a range of larger diameters, and then have asymmetric porosity for the reactor layer 39, but with a range of smaller diameters than in the reagent layer 32. However, in the present embodiment it was opted to provide the reagent layer as a woven material, details of which will be shown and elucidated with reference to FIG. 5.

In order to prevent the reagent from already reacting with the priming substance, they are provided in separate layers, here in the reagent layer 32, and in the reactor layer 39, respectively. Both layers are combined e.g. by means of an adhesive layer 38. This layer 38 needs to be liquid permeable. This may be achieved by its inherent properties, but it may also be brought about by providing throughgoing openings through the layer 38, such as by means of a laser burning holes in it.

FIG. 5 shows detail "A" of FIG. 4 in diagrammatic close-up. It shows a woven structure of the layer 32, comprised of first strands 40-1, 40-2 in a first direction, and second strands 41 in a second direction, each consisting of a plurality of filaments 42. The reagent has been provided on, between and/or within the strands 42.

The woven structure has been shown only very diagrammatically, and it is certainly possible to have more layers, or a more intricate structure of the layer 32. It was found by the inventors that such a structure is able to hold more liquid, such as milk. For that reason, it is also possible to provide more reagent (colouring agent or the like), so that the intensity and/or definition of the reaction can be increased. This in turn further increases the reliability and/or speed of the reaction and the subsequent determination of the presence and/or concentration of the milk component.

The invention claimed is:

1. A milking system, comprising:

a milking means comprising a milking control device, and arranged for milking milk from a dairy animal;

a milk line in fluid connection with the milking control device; and a sampling and analysis device arranged to take a sample of the milk from the milk line and to analyse the sample, wherein the sampling and analysis device comprises an analysis tape, comprising a carrier layer with a first side and an opposite second side, wherein on the first side there is provided at least one reagent tape layer comprising a reagent that is arranged to provide a detectable response in the presence of at least one substance in the sample;

a dosing device arranged to provide a droplet of said milk from said sample onto the reagent tape layer;

an optical radiation source for emitting optical source radiation onto the analysis tape; and an optical sensor device arranged to detect optical response radiation emitted by the reagent tape layer along an optical path to the optical sensor and in response to said emitted source radiation received by said reagent tape layer, to analyse a detected optical response radiation to provide an indication of a presence or a concentration of said at least one substance in said droplet, wherein the carrier layer is transmissive to the optical radiation, wherein the first side faces away from the optical path to the optical sensor device during analysing by the optical sensor device, and wherein the reagent tape layer comprises, or is, a material with an asymmetrical porosity, having a largest pore size at the first side, and a smallest pore size at the second side.

2. The milking system according to claim 1, wherein the milking control device is arranged to control at least a part of the milking on a basis of said indication.

3. The milking system according to claim 1, wherein the largest pore size is larger than an average fat globule diameter of milk from said dairy animal, and the smallest pore size is smaller than said average fat globule diameter.

4. The milking system according to claim 1, wherein said largest pore size is between 5 and 20 μm, and wherein said smallest pore size is between 0.05 and 2 μm.

5. The milking system according to claim 1, wherein the reagent tape layer comprises, or is, a polysulfone or a polyethersulfone.

6. The milking system according to claim 1, wherein the reagent tape layer further comprises, as separate layers:

an indicator layer;

an adhesive layer; and a reactor layer, wherein said indicator layer comprises said reagent, the reagent being transportable by the sample of milk through the adhesive layer to the reactor layer, wherein said reactor layer comprises a substance for enhancing or inducing said response from said reagent in the presence of said at least one substance in the sample, and wherein at least one of the reactor layer and the indicator layer comprises said material with an asymmetrical porosity.

7. The milking system according to claim 1, wherein the milking control device is arranged to guide a milked milk to an indication-dependent destination.

* * * * *